Patented Feb. 20, 1934

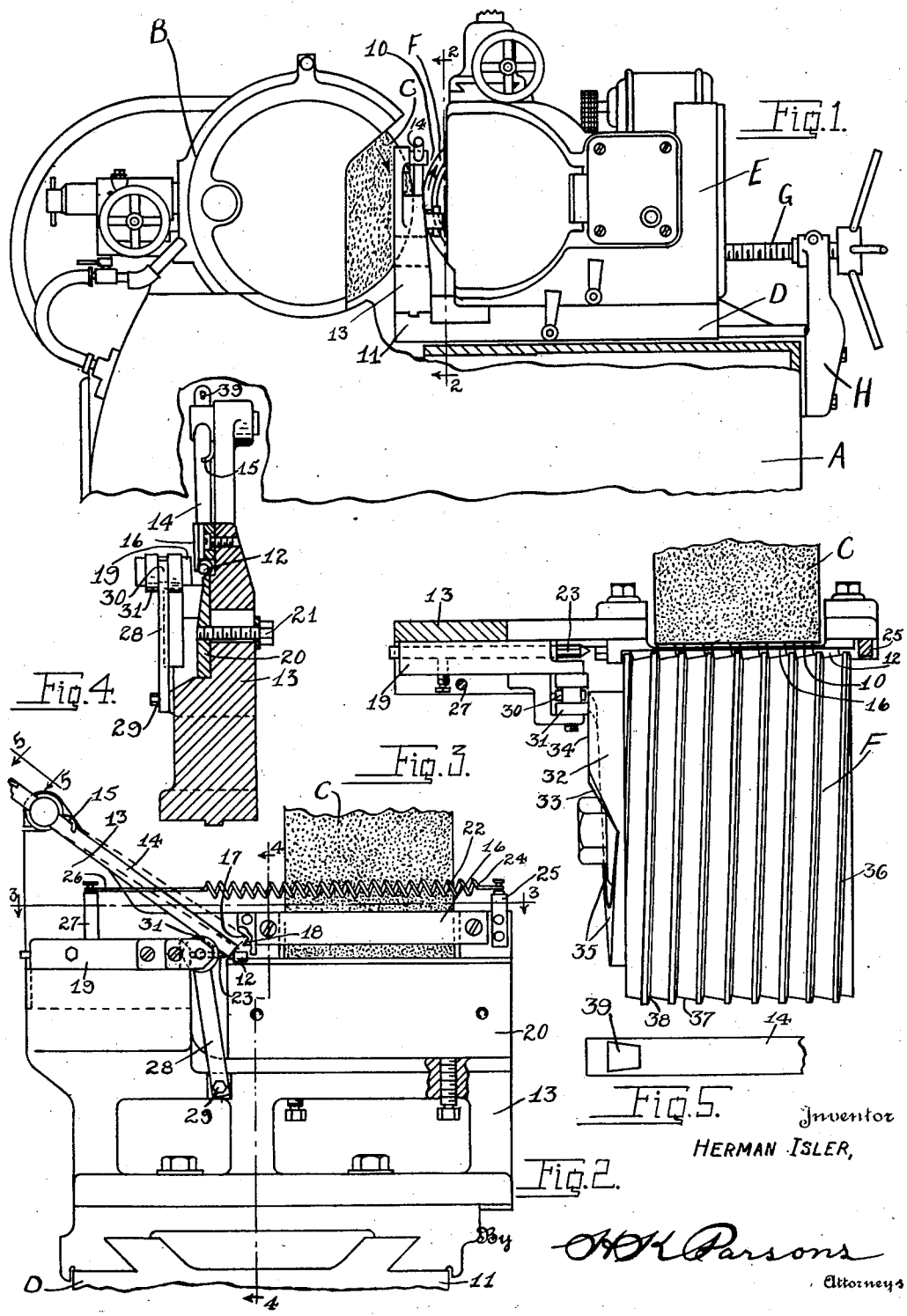

1,948,113

UNITED STATES PATENT OFFICE 1,948,113

CENTERLESS WORK FEED

Herman Isler, Cincinnati, Ohio, assignor to Cincinnati Grinders Incorporated, Cincinnati, Ohio, a corporation of Ohio Original application April 20, 1925, Serial No. 24,477. Divided and this application March 22, 1928, Serial No. 263,653. Renewed December 21, 1929

24 Claims. (Cl. 51—103)

This invention relates to improvements in grinding machinery and more particularly to what is commonly termed centerless grinders.

In centerless grinding there are two ordinary methods of producing work pieces of circular shape in cross section. One method is known as the in-feed method and comprises introducing work pieces into the grinding throat at one side of the machine and subsequently removing the work from the grinding throat in the same direction as that in which it was introduced. The other method is known as the through-feed method in which the work passes axially from one side of the machine to the other during the grinding operation.

This form of grinding is especially adapted to the grinding of cylindrical pieces which are to be ground to a constant uniform diameter. Heretofore all shouldered and most tapered pieces were ground by the in-feed method. This invention relates to means whereby tapered pieces may be ground by the through-feed method.

A particular object of the invention is the provision of an automatic machine for satisfactorily presenting and feeding formed or non-cylindrical work pieces to and through the grinding throat of a centerless grinder for proper stock removal from said work pieces.

A further object of the present invention is the provision of mechanism utilizable in conjunction with a grooved regulating wheel structure for synchronizing the introduction of the work in proper position and timed relation to the presentation of the work receiving portion of the groove and insure satisfactory non-jambing positioning of the work.

A further object of the invention is the provision of improved work feeding and work introducing units capable of ready application to a standard type commercial centerless grinder to enable the production of tapered or other work pieces of non-uniform diameter by said machine.

In the attainment of these objects the invention in its broad aspect comprises a feed member for successively introducing work pieces within the grinding throat of a centerless grinding machine coupled with means for axially feeding the work through the grinding throat. In a more specific aspect the invention includes means for gravitationally feeding work pieces to the grinding throat means for controlling and limiting the feed of a single work piece and means for synchronizing the operation of the work introducing means and the means for axially feeding the work through the grinding throat.

This application is a division of my application Serial No. 24,477, filed April 20, 1925; now Patent No. 1,733,094 of October 22, 1929.

Further features of novelty in the construction and the advantages attendant thereon should be apparent by reference to the following specification taken in connection with the accompanying drawing, forming a part thereof, and it will be understood that I may make any modifications in the specific details of construction or combination and arrangement of parts hereinafter disclosed within the scope of the appended claims without departing from or exceeding the spirit of the invention.

Figure 1 is a fragmentary front elevation of a machine equipped with my improvements.

Figure 2 is an enlarged fragmentary sectional view taken on line 2—2 of Figure 1.

Figure 3 is a plan view showing parts in cross section as on line 3—3 of Figure 2.

Figure 4 is a sectional view taken on line 4—4 of Figure 2, and

Figure 5 is an enlarged fragmentary plan view of a part of the feed tube as seen from line 5—5 of Figure 2.

In the drawing, in which similar characters of reference are employed to denote corresponding parts throughout the several views, the letter A designates the bed of a commercial type centerless grinder having mounted thereon the housing B for the suitably driven grinding wheel C. In addition, there is mounted on the bed a slide D in turn serving to support the regulating wheel unit E. This unit has mounted thereon a regulating wheel F disposed in opposition to the grinding wheel C so that the parts form therebetween a work receiving throat 10. The parts just described are all of well known commercial form, the grinding wheel C being driven downwardly at the work throat as indicated by the arrow thereon and the regulating wheel surface being moved upwardly at the work throat. The grinding wheel is operated at a suitable grinding surface speed preferably over four thousand feet per minute, while the regulating wheel surface moves at a slow rate, such as 80–100 feet per minute, with the result that the grinding wheel serves to remove material from a work piece while the regulating wheel controls the speed of rotation thereof.

Adjusting screw member G is carried by a bracket H on the bed and connected with the unit E. On account of the intermediate location of the slide D which may be locked either to bed A or unit E, this slide may move with unit E when locked thereto or unit E may be moved relative to the slide when the slide is locked to the bed. The inner portion of slide D is provided with a bracket or support portion 11 disposed beneath the grinding throat 10. This support carries the work feed mechanism hereinafter more fully described.

As previously mentioned, the machine in question is intended for operation on tapered work or other formed work and as shown the grinding wheel C has a plain transverse peripheral face while the regulating wheel F has an active face of double the taper which is to be imparted to the work pieces 12 which are shown in the form of rolls of the kind ordinarily utilized in roller bearings.

Mounted upon the basal support 11 is the bracket member 13 to which is pivoted a feed tube 14 downwardly actuated by spring 15. Disposed adjacent the lower end of the feed tube 14 and within the grinding throat 10 is the stop plate 16 having a recess 17 normally receiving the lower end of the tube and the wall 18 forming a work retaining closure for the feed tube. A reciprocating slide 19 is supported by the bracket 13 in a position just above the work rest 20. The work rest 20 is adjustably secured to the bracket member 13 by suitable means, such as cap screws or the like 21. This slide is actuated toward the right, as seen in Figure 2, by a suitable spring 22 and the slide has adjustably secured thereto the feed plunger portion 23 for positioning the work piece 12 into the grinding throat. The spring 22 has its one end 24 secured to a post 25 carried by the right-hand end portion of the bracket 13 as seen in Figure 2 while the other end 26 is secured to a post 27 carried by the slide member 19.

To control reciprocation of the slide use is made of the lever 28 pivoted to the lower portion of bracket 13 as at 29 and having its upper end 30 in engagement with the slide. This upper end bears a roller 31 in contact with a cam 32 secured to the regulating wheel F or formed integral therewith. This cam as indicated in Figure 3 has an abrupt rise as at 33, an intermediate dwell as at 34 and a gradually receding portion 35. This form of cam is particularly adapted for use in conjunction with what is known as a spiral feeding wheel or wheel having a positive helical rib for guiding the work. As shown herein the regulating wheel F comprises such a helical rib 36 and a helical active surface 37 between the convolutions of the rib. This active surface, as stated above, has double the taper to be formed on the finished work pieces 12. The side 38 of the rib 36 that faces the active surface 37 is inclined and forms such an angle with the said active surface as will insure the proper taper and finish being formed on the work pieces. It will be noted that the rib 36 serves as a progressively receding limit stop and the movement of the work and the cam is designed to correspond with the recession of the rib.

The feed tube 14 is provided at its upper end with an opening 39 corresponding in size and shape to the work piece to be introduced therein. By forming the opening in the work tube in this shape the work can be introduced into the grinding throat in but one way, namely with the smaller end forward.

In operation, the portion 33 of the cam will engage roller 31 forcing same to the left as shown in Figure 2 withdrawing the plunger 23 and thus relieving the tube 14 of the retaining pressure of the wedge-like control abutment, allowing the tube to swing downward from the position shown in dotted lines in Figure 2 to that shown in solid lines in said figure. This downward swinging movement allows the lowermost work piece 12 to slide from the end of the tube 14 into contact with guide rib 36 of the regulating wheel F. As the cam rotates beyond the dwell 34 so that the roller 31 begins to engage the receding portion 35 thereof spring 68 will shift slide 19 to the right, as seen in Figure 2. This action causes abutment or feed plunger 23 to engage and raise the feed or guide tube 14 while at the same time the feed plunger 23 projecting forwardly beneath the lower end of the tube yieldingly engages the end of the work piece 12 to press it to the right into close contact with the face of rib 36, exerting a continuous follow up pressure until the work piece has entered practically entirely within the helical groove formed by the convolutions of the rib. As this takes place in substantially a turn of the feed or regulating wheel, the rise 33 of the cam will then just be in position to impart a rapid reverse movement to lever 28 and associated parts allowing the tube to spring down for ejection of a new work piece when the operation is repeated.

It will thus be seen that the mechanism above described comprising the specific regulating wheel unit having the helical contoured work receiving path for traversing the work as respects the grinding wheel and having the terminal or lateral face cam member, may be readily mounted on a standard regulating wheel spindle and likewise the bracket member carrying the work rest and guide, the magazine feed tube, and control injector system for urging the individual work pieces in progressive engagement with the gradually receding wall or rib of the groove in the work piece may also be easily mounted on the standard work rest slide, consequently with the two units applied to a standard machine this machine is then adapted for the automatic continuous grinding and production of taper or other formed articles in a centerless grinder and correct introduction and presentation of the parts to the grinding wheel is insured.

What is claimed is:

1. In a device of the class described the combination of means forming a grinding throat, said means including a regulating wheel having a helical rib formed thereon, a work rest within the throat, a slide for inserting work pieces into the grinding throat, a cam, and an arm and roller associated with the slide for actuation by the cam for placing a work piece within the path of the helical rib whereby said work piece is axially fed through the grinding throat.

2. A device of the character described including opposed grinding and regulating members forming a work receiving throat therebetween, a work rest disposed within the throat, work feeding mechanism including a reciprocable slide for inserting work pieces into the grinding throat, and a helical rib formed on the periphery of the regulating wheel for feeding work pieces axially through the grinding throat.

3. In a device of the class described the combination of means including a regulating wheel for providing a work receiving throat, a helical rib formed on the regulating wheel for moving a work piece axially through the grinding throat, the rib forming a constantly receding stop for the work pieces, and a reciprocable slide having a feed member for controlling the position of the work within the throat, said feed member being adjustable with respect to the stroke of the slide to vary its engagement with the work piece as respects a given position of the slide, and to synchronize the movement of the work pieces with the constantly receding stop formed by the helical rib.

4. A machine of the centerless grinder type including a work support, a grinding wheel disposed on one side of the work support with its operative surface moving in a direction to urge work against said support, a regulating wheel disposed at the opposite side of the support and with its operative surface moving upwardly as respects the support to control the rotation of work pieces disposed thereon, automatic means for presenting work pieces to the grinding throat between said grinding and regulating wheels, and means actuable by rotation of the regulating wheel for operating said automatic feed mechanism.

5. A machine of the centerless grinder type including a work support, a grinding wheel disposed on one side of the work support with its operative surface moving in a direction to urge work against said support, a regulating wheel disposed at the opposite side of the support and with its operative surface moving upwardly as respects the support to control the rotation of work pieces disposed thereon, automatic means for presenting work pieces to the grinding throat between said grinding and regulating wheels, and connections between the regulating wheel and the automatic feed mechanism for actuating the latter to present a work piece to the grinding throat on each revolution of the regulating wheel.

6. A machine of the centerless grinder type including a work support, a grinding wheel disposed on one side of the work support with its operative surface moving in a direction to urge work against said support, a regulating wheel disposed at the opposite side of the support and with its operative surface moving upwardly as respects the support to control the rotation of work pieces disposed thereon, automatic means for presenting work pieces to the grinding throat between said grinding and regulating wheels, connections between the regulating wheel and the automatic feed mechanism for actuating the latter to present a work piece to the grinding throat on each revolution of the regulating wheel, and at a predetermined point as respects the rotation of said wheel, said wheel having a track way formed with a work receiving portion shiftable to receive the automatically fed work at the predetermined presentation thereof.

7. A regulating wheel for use in conjunction with a centerless grinder comprising a cylindrical member of large diameter relative to the diameter of work pieces to be controlled thereby said wheel being peripherally formed with an advancing helical work engaging track way for traversing work through the machine and being terminally formed with a cam portion for controlling presentation of work to the track way.

8. A regulating wheel for use in conjunction with a centerless grinder comprising a cylindrical member of large diameter relative the diameter of work pieces to be controlled thereby said wheel being peripherally formed with an advancing helical work engaging track way for traversing work through the machine and being terminally formed with a cam portion for controlling presentation of work to the track way, said cam having a gradual pitch corresponding to that of the helical track way and a sharp riser adjacent the work receiving entrance to the track way.

9. A centerless grinder structure including opposed grinding and regulating wheels forming a work receiving throat therebetween, a work rest projecting into the throat for supporting a work piece in operative relation to the wheels, the regulating wheel being formed with a helical peripheral pathway for guiding the work piece during the grinding and having an inclined entrance guide portion extending peripherally thereof, of gradually increasing depth for receiving a work piece, means for resiliently urging a work piece axially of the regulating wheel into said entrance portion of the path and a receding stop member movable with the regulating wheel for progressively limiting the resilient urge of the work piece.

10. A centerless grinder structure including opposed grinding and regulating wheels forming a work receiving throat therebetween, a work rest projecting into the throat for supporting a work piece in operative relation to the wheels, the regulating wheel being formed with a helical peripheral pathway for guiding the work piece during the grinding and having an inclined entrance guide portion extending peripherically thereof, of gradually increasing depth for receiving a work piece, means for resiliently urging a work piece axially of the regulating wheel into said entrance portion of the path and a receding stop member movable with the regulating wheel for progressively limiting the resilient urge of the work piece, said work urging member including a pusher, and means for rapidly retracting the pusher at a given point in the rotation of the regulating wheel to insure proper clearance between the pusher and the regulating wheel.

11. A centerless grinder structure including opposed grinding and regulating wheels forming a work receiving throat therebetween, a work rest projecting into the throat for supporting a work piece in operative relation to the wheels, the regulating wheel being formed with a helical peripheral pathway for guiding the work piece during the grinding and having an inclined entrance guide portion extending peripherally thereof, of gradually increasing depth for receiving a work piece, means for resiliently urging a work piece axially of the regulating wheel into said entrance portion of the path and a receding stop member movable with the regulating wheel for progressively limiting the resilient urge of the work piece, said work urging member including a pusher, means for rapidly retracting the pusher at a given point in the rotation of the regulating wheel to insure proper clearance between the pusher and the regulating wheel, and means for laterally steadying the work as it is resiliently, axially urged in the direction of the regulating wheel path.

12. In grinding apparatus, in combination, a grinding wheel rotated at a relatively high speed, a regulating wheel having a helical pathway therein, the base portion of which makes an angle to the face of the grinding wheel equal to twice the angle of the taper of the work pieces to be ground, said helical pathway having an entry end and said regulating wheel being rotated at a low speed and in a direction to control the rotation of the work pieces during the grinding action thereon by said grinding wheel, means for holding a work piece adjacent that portion of the regulating wheel having the entry end of said pathway therein, means operating in synchronism with the presentation of said entry end of said pathway adjacent said work-holding means as said regulating wheel rotates for moving a work piece on said work-holding means into position to enter said entry end of said pathway, and means preventing the presentation of a tapered work piece to said work-holding means reversed end for end.

13. In grinding apparatus, in combination, a grinding wheel rotated at a relatively high speed, a regulating wheel having a helical pathway therein, the base portion of which makes an angle to the face of the grinding wheel equal to twice the angle of the taper of the work pieces to be ground, said helical pathway having an entry end and said regulating wheel being rotated at a low speed and in a direction to control the rotation of the work pieces during the grinding action thereon by said grinding wheel, means for holding a work piece adjacent that portion of the regulating wheel having the entry end of said pathway therein, mechanism adapted to hold a plurality of tapered work pieces and to present them one at a time to said work-holding means, said mechanism having means for preventing the insertion therein of tapered work pieces turned end for end, and means operating in timed relation with the presentation of the entry end of said helical pathway to said work-holding means for moving a presented work piece into a position to be presented to said entry end of said pathway.

14. In grinding apparatus, in combination, a grinding wheel, a regulating wheel having a helical groove therein and rotated at a speed and in a direction to control the rotation of work of round section during grinding operation thereon by said grinding wheel, said helical groove having an entry end, means for holding work of round section in operative relation to said two wheels, a cam rotated in timed relation with the rotation of said regulating wheel, and means controlled by said cam for presenting a work piece to the grinding throat formed by said two wheels and said work-holding means, said cam having a portion for causing said controlled means to present a work piece thereto only when said entry end of said groove is in proper position.

15. In grinding appartus, in combination, a grinding wheel, a regulating wheel having a helical groove therein and rotated at a speed and in a direction to control the rotation of work of round section during grinding operation thereon by said grinding wheel, said helical groove having an entry end, means for holding work of round section in operative relation to said two wheels, yieldingly acting means adapted to move a work piece along said work-holding means, and means operating in timed relation to the presentation of said entry end of said groove to said work-holding means for causing said yieldingly acting means to operate.

16. In grinding apparatus, in combination, a grinding wheel, a regulating wheel having a helical groove therein and rotated at a speed and in a direction to control the rotation of work of round section during grinding operation thereon by said grinding wheel, said helical groove having an entry end, means for holding work of round section in operative relation to said two wheels, means for moving a work piece relative to said work-holding means, yieldingly acting means for presenting a work piece to said work-moving means, and means operating at a predetermined point in the rotary movement of said entry end for causing actuation of said work-moving means.

17. In grinding apparatus, in combination, a grinding wheel, a regulating wheel having a helical groove therein and rotated at a speed and in a direction to control the rotation of work of round section during grinding operation thereon by said grinding wheel, means for holding work in operative relation to said two wheels, a movably mounted downwardly inclined chute for holding a supply of work pieces, a stop, means for holding said chute in a position so that said stop prevents the exit of work pieces therefrom, and means operating in timed relation to the rotary movement of said entry end of said groove for effecting movement of said chute away from said stop and to cause the positioning of a work piece on said work-holding means.

18. In grinding apparatus, in combination, a grinding wheel, a regulating wheel having a helical groove therein and rotated at a speed and in a direction to control the rotation of work of round section during grinding operation thereon by said grinding wheel, means for holding work in operative relation to said two wheels, a movably mounted downwardly inclined chute for holding a supply of work pieces, a stop, means for holding said chute in a position so that said stop prevents the exit of work pieces therefrom, means for moving said chute away from said stop to permit the discharge of a work piece therefrom onto said work-holding means, and means operating in timed relation to the rotary movement of the entry end of said helical groove for moving a work piece thus presented into operative relation to said entry end.

19. In grinding apparatus, in combination, a grinding wheel, a regulating wheel having a helical groove therein and rotated at a speed and in a direction to control the rotation of work of round section during grinding operation thereon by said grinding wheel, means for holding work in operative relation to said two wheels, a movably mounted downwardly inclined chute for holding a supply of work pieces, a stop, yielding means for moving said chute away from said stop to permit the discharge therefrom of a work piece onto said work-holding means, and means operating in timed relation to the rotation of said regulating wheel for permitting said yielding means to operate.

20. In grinding apparatus, in combination, a grinding wheel, a regulating wheel having a helical groove therein and rotated at a speed and in a direction to control the rotation of work of round section during grinding operation thereon by said grinding wheel, means for holding work in operative relation to said two wheels, means forming a magazine for holding a supply of work pieces and including mechanism adapted to discharge work pieces one by one from said magazine onto said work-holding means, and means operating in timed relation to the rotary movement of said entry end of said helical groove for causing actuation of said mechanism.

21. In grinding apparatus, in combination, a grinding wheel, a regulating wheel having a helical groove therein and rotated at a speed and in a direction to control the rotation of work of round section during grinding operation thereon by said grinding wheel, means for holding work in operative relation to said two wheels, means forming a magazine for holding a supply of work pieces and including mechanism adapted to discharge work pieces one by one from said magazine onto said work-holding means, and means operating at a predetermined point in the rotation of said regulating wheel for moving a work piece discharged from said magazine into operative relation to the entry end of said helical groove.

22. In grinding apparatus, in combination, means forming a grinding throat comprising a grinding wheel, a regulating wheel, means for holding work in operative relation to said two wheels, said regulating wheel being rotated at a speed and in a direction relative to the direction of surface movement of the grinding wheel to control the rotation of a work piece of round sections supported by said work-holding means and during the grinding operation thereon by said grinding wheel, said regulating wheel having a peripheral rib upstanding from the work-engaging surface of the regulating wheel, thereby forming a peripheral trackway that is traversed relative to the work piece as the regulating wheel rotates, said rib forming an abutment for an end of a work piece as the latter is rotated by the movement of the regulating wheel surface while the grinding wheel performs a grinding operation on said work piece; means forming a magazine for holding a supply of work pieces and including mechanism adapted to discharge work pieces one by one from said magazine into said trackway; and means operating in timed relation to the rotary movement of said regulating wheel with its trackway for causing actuation of said mechanism, thereby to inject a work piece into said trackway at a particular point in the latter.

23. In grinding apparatus, in combination, means forming a grinding throat comprising a grinding wheel, a regulating wheel, means for holding work in operative relation to said two wheels, said regulating wheel being rotated at a speed and in a direction relative to the direction of surface movement of the grinding wheel to control the rotation of a work piece of round section supported by said work-holding means and during the grinding operation thereon by said grinding wheel, said regulating wheel having a peripheral rib upstanding from the work-engaging surface of the regulating wheel, thereby forming a peripheral trackway that is traversed relative to the work piece as the regulating wheel rotates, said rib forming an abutment for an end of a work piece as the latter is rotated by the movement of the regulating wheel surface while the grinding wheel performs a grinding operation on said work piece, said trackway having an entry end at a certain point in the periphery of said regulating wheel to permit insertion of work pieces into the trackway; means for feeding work pieces, one at a time, into said trackway; and means for operating said feeding means in timed relation to the rotation of said regulating wheel to feed a work piece into the trackway by way of the said entry end, thereby to inject a work piece into the grinding throat during each rotation of the regulating wheel.

24. In grinding apparatus, in combination, means forming a grinding throat comprising a grinding wheel, a regulating wheel, means for holding work in operative relation to said two wheels, said regulating wheel being rotated at a speed and in a direction relative to the direction of surface movement of the grinding wheel to control the rotation of a work piece of round section supported by said work-holding means and during the grinding operation thereon by said grinding wheel, said regulating wheel having a peripheral rib upstanding from the work-engaging surface of the regulating wheel, thereby forming a peripheral trackway that is traversed relative to the work piece as the regulating wheel rotates, said rib forming an abutment for an end of a work piece as the latter is rotated by the movement of the regulating wheel surface while the grinding wheel performs a grinding operation on said work piece, said trackway having an entry end at a certain point in the periphery of said regulating wheel to permit insertion of work pieces into the trackway; means for presenting work pieces to said trackway and positioned so that said entry end of said trackway is brought into operative relation to said means as said regulating wheel rotates; and connections between said regulating wheel and said work piece-presenting means for effecting actuation of the latter to present a work piece to the trackway by way of said entry end of said trackway as the latter is brought, by the rotation of said regulating wheel, into operative relation thereto.

HERMAN ISLER.

CERTIFICATE OF CORRECTION.

Patent No. 1,948,113. February 20, 1934.

HERMAN ISLER.

It is hereby certified that error appears in the printed specification of the above numbered patent requiring correction as follows: Page 5, line 27, claim 22, for "sections" read section; and that the said Letters Patent should be read with this correction therein that the same may conform to the record of the case in the Patent Office.

Signed and sealed this 19th day of June, A. D. 1934.

Bryan M. Battey (Seal)

Acting Commissioner of Patents.